(12) United States Patent
Sorensen et al.

(10) Patent No.: US 9,440,857 B2
(45) Date of Patent: Sep. 13, 2016

(54) PROCESS FOR HIGH-YIELD PRODUCTION OF GRAPHENE VIA DETONATION OF CARBON-CONTAINING MATERIAL

(71) Applicant: Kansas State University Research Foundation, Manhattan, KS (US)

(72) Inventors: Christopher Sorensen, Manhattan, KS (US); Arjun Nepal, Manhattan, KS (US); Gajendra Prasad Singh, Jharkhand (IN)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 14/272,924

(22) Filed: May 8, 2014

(65) Prior Publication Data

US 2014/0335010 A1 Nov. 13, 2014

Related U.S. Application Data

(60) Provisional application No. 61/821,816, filed on May 10, 2013.

(51) Int. Cl.
*C01B 31/04* (2006.01)

(52) U.S. Cl.
CPC ....... *C01B 31/0446* (2013.01); *C01B 2204/20* (2013.01); *C01B 2204/32* (2013.01)

(58) Field of Classification Search
CPC ................ C01B 31/0438; C01B 31/0446
USPC ..................... 423/445 B; 977/734
See application file for complete search history.

(56) References Cited

U.S. PATENT DOCUMENTS 7,691,909 B2    4/2010  Sorensen et al.
2010/0278712 A1  11/2010  Swanson

FOREIGN PATENT DOCUMENTS

CN    102249219 A  * 11/2011

OTHER PUBLICATIONS

Machine English translation of CN 102249219 A.*
Nepal, Arjun, Bret Flanders, and Christopher Sorensen. "Graphene in Carbon Aerosol Gels formed via Controlled Hydrocarbon Detonation." (2011).*
Sorensen, Christopher M., et al. "Formation of Light-weight Low-density Materials via Gas Phase Aerosol Gelation." MRS Proceedings. vol. 1306. Cambridge University Press, 2011.*
The Power Point presentation entitled "Formation of Light-weight Low-density Materials via Gas Phase Aerosol Gelation," presented at AAAR 30th Annual Conference, 2011.

* cited by examiner

*Primary Examiner* — Richard M Rump
(74) *Attorney, Agent, or Firm* — Hovey Williams LLP

(57) ABSTRACT

A method of producing pristine graphene particles through a one-step, gas-phase, catalyst-free detonation of a mixture of one or more carbon-containing compounds hydrocarbon compounds and one or more oxidizing agents is provided. The detonation reaction occurs very quickly and at relatively high temperature, greater than 3000 K, to generate graphene nanosheets that can be recovered from the reaction vessel, such as in the form of an aerosol. The graphene nanosheets may be stacked in single, double, or triple layers, for example, and may have an average particle size of between about 35 to about 250 nm.

31 Claims, 10 Drawing Sheets

US 9,440,857 B2

PROCESS FOR HIGH-YIELD PRODUCTION OF GRAPHENE VIA DETONATION OF CARBON-CONTAINING MATERIAL

RELATED APPLICATION

This application claims the benefit of U.S. Provisional Patent Application No. 61/821,816, filed May 10, 2013, which is incorporated by reference herein in its entirety.

BACKGROUND OF THE INVENTION

1. Field of the Invention

The present invention is generally directed toward methods for producing graphene particles through an eco-friendly, one-step process involving the controlled detonation of a carbon-containing material with an oxidizing agent. In particular embodiments, the invention involves the detonation of a gas-phase hydrocarbon compound with a source of oxygen at relatively high temperatures to produce pristine graphene nanosheets without the use of catalytic materials.

2. Description of the Prior Art

Graphene is a two dimensional monolayer of $sp^2$ bonded carbon atoms in a hexagonal crystal structure. It has been drawing considerable interest because of its unique physical properties including excellent mechanical strength, high intrinsic carrier mobility at room temperature, and electrical and thermal conductivity comparable to the in-plane value of graphite. These properties open gateways for the potential applications of graphene in technological areas such as nanoelectronics, sensors, nanocomposites, batteries, supercapacitors, and hydrogen storage. Pioneering work for the production of graphene was first done by the micromechanical cleavage of highly ordered pyrolytic graphite (HOPG). However, the low yield makes it unsustainable for large-scale use. Numerous methods for preparation of graphene nanosheets have since been developed including chemical vapor deposition (CVD), ultrasonication-assisted exfoliation of graphene oxide (GO) from graphite oxide in water, epitaxial growth on an electrically insulating surface, solution-based chemical reduction of GO, rapid thermal exfoliation of expanded graphite into graphene, high temperature heating of polymer on metal/insulator surface, and gas-phase plasma synthesis. Notably, the CVD method has been used in a roll-to-roll production of 30-inch monolayer graphene films.

For the production of large quantities of graphene, the modified Hummer's method for the production of GO through chemical exfoliation of graphite to graphite oxide and then graphite oxide to GO has gained much attention due to low-cost and higher yield in comparison to other methods. However, this method is not ideal because the GO produced suffers from some important drawbacks such as poor electrical conductivity due to the presence of epoxide, carboxyl, and hydroxyl groups on the graphene sheets. Further, the reduction of GO to graphene needs insalubrious chemical reductants such as hydrazine or sodium borohydride, and high temperature heating in order to recover the graphitic structure. Moreover, the reduction process cannot completely remove the many structural defects introduced by the oxidation process. A few environmentally friendly processes are available to reduce GO to graphene either by chemical or electrochemical methods, but these give low yield. Thus despite the usefulness of previous graphene synthetic methods, none appear to offer economical, eco-friendly, kilogram scale production of the material.

SUMMARY OF THE INVENTION

In one embodiment of the present invention, a method of synthesizing a graphene particulate material is provided. A mixture comprising a combustible carbon-containing material and an oxidizing agent for the carbon-containing material is provided within an enclosed vessel. The mixture is detonated within the vessel. The heat produced by the detonation causes a temperature of at least 3000 K so as to generate graphene particles. The graphene particles are then recovered from the vessel.

In another embodiment of the present invention, a method of synthesizing a graphene particulate material is provided. A mixture comprising a C1-C12 hydrocarbon compound and oxygen is provided within an enclosed vessel. The mixture is detonated within the vessel. The heat produced by the detonation causes a temperature of at least 3000 K thereby producing an aerosol comprising graphene nanosheets. The graphene nanosheets are removed from the vessel prior to aggregation of the nanosheets into a carbon gel.

In still another embodiment of the present invention, a method of synthesizing a graphene particulate material is provided. A mixture comprising a combustible carbon-containing material and an oxidizing agent for the carbon-containing material is provided within an enclosed vessel. The mixture is detonated within the vessel so as to generate graphene particles. The graphene particles are recovered from the vessel prior to aggregation of the graphene particles into a carbon gel.

BRIEF DESCRIPTION OF THE DRAWINGS

FIG. 2 is a graph of intensity of light emitted during the detonation versus time for a typical detonation acquired by the pyrometer system and the corresponding temperature after the ignition system is turned on;

DETAILED DESCRIPTION OF THE PREFERRED EMBODIMENT

Figure 1:
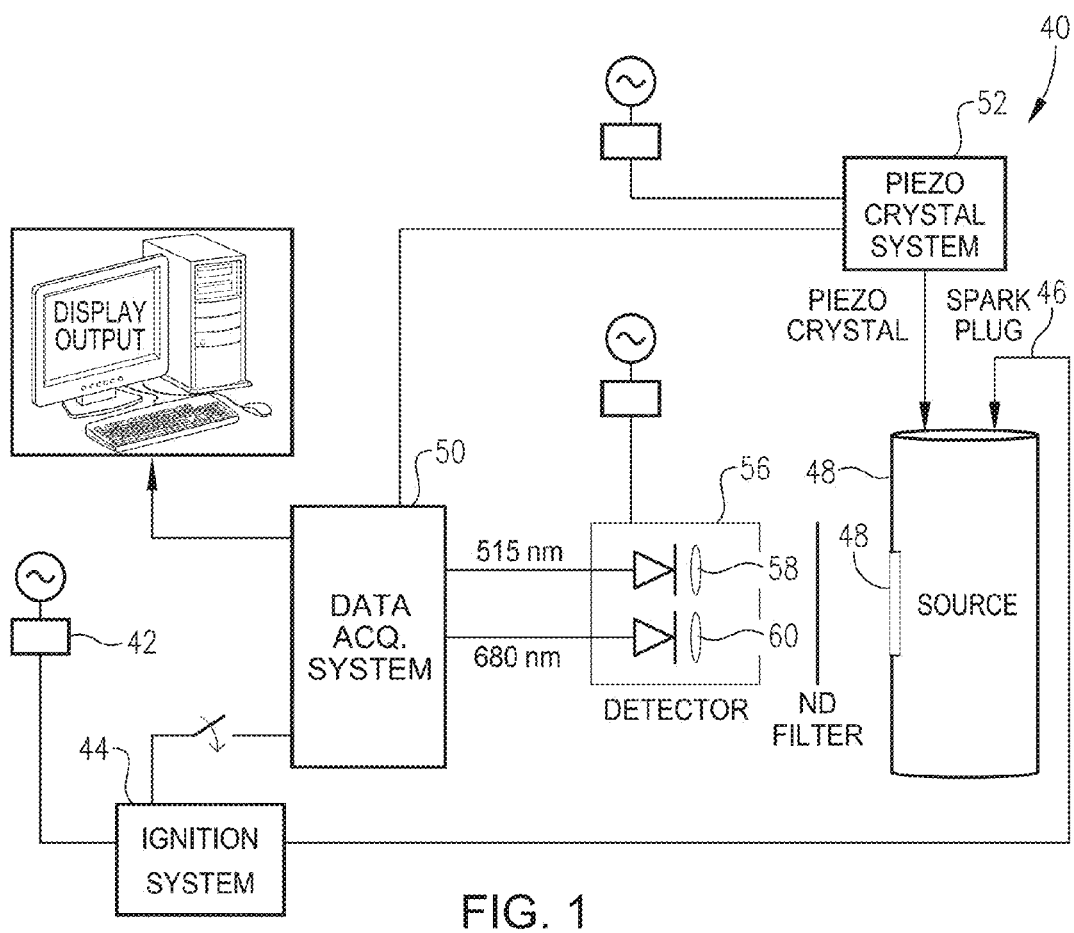
FIG. 1 is a schematic illustration of the experimental set-up used in hydrocarbon detonation for the production of graphene nanosheets.

The present invention pertains to methods of graphene production via a one-step process that involves the controlled detonation of a reaction mixture comprising a carbon-containing material and an oxidizing agent at relatively high temperatures. The carbon-containing mixture can be any material that can provide an adequate supply of carbon from which the graphene may be synthesized. In certain embodiments, it is preferable for the carbon-containing mixture to also supply the energy needed during detonation to achieve the required elevated temperature conditions necessary for graphene formation. However, in addition to the carbon-containing material, the reaction mixture may comprise other fuels, such as hydrogen, capable of generating heat through combustion or detonation along with the carbon-containing material. Moreover, the graphene production process is environmentally friendly and does not require any sort of catalyst to facilitate graphene synthesis.

In particular embodiments, the carbon-containing material is a hydrocarbon compound, and preferably a saturated or unsaturated C1-C12 hydrocarbon compound. In certain embodiments, acetylene is a particularly preferred hydrocarbon material. The carbon-containing material may comprise a single material or compound, or a mixture of carbon-containing compounds. For example, acetylene may be the only carbon-containing compound present in the reaction mixture, or the reaction mixture may comprise a mixture of hydrocarbon compounds. Moreover, the carbon-containing material need not be supplied as a gas. The carbon-containing mixture may comprise a solid or liquid that is capable of being finely dispersed within the reaction vessel. In certain embodiments, the carbon-containing material should present as great of a surface area as possible so that the detonation reaction proceeds quickly and generates the heat necessary for achieving the desired reaction temperatures.

The reaction mixture further comprises an oxidizing agent capable of oxidizing the carbon-containing material upon detonation of the reaction mixture. In certain embodiments, the oxidizing agent comprises oxygen, either in its elemental form or compounded with other elements. In particular embodiments, the oxidizing agent is selected from the group consisting of $O_2$, $N_2O$, NO, and mixtures thereof. When the oxidizing agent comprises $O_2$, the $O_2$ may be supplied in substantially pure form, (i.e., 99% or greater), as air, or along with other inert materials.

The ratio of oxidizing agent to carbon-containing material present in the reaction vessel prior to detonation can contribute to the characteristics of the graphene particles formed upon detonation of the reaction mixture. In certain embodiments, the molar ratio of oxidizing agent to carbon-containing material is 1.5 or less. In particular embodiments, the ratio of oxidizing agent to carbon-containing material is between about 0.1 to about 1.5, between about 0.2 to about 1.2, between about 0.4 to about 1.0, or between about 0.6 to about 0.8.

The reaction mixture is supplied or loaded into a reaction vessel where it will be detonated to generate the graphene particles. As used herein, "detonation" is distinguished from mere "deflagration" or "burning" of the carbon-containing material. Detonation typically involves a supersonic exothermic front that accelerates through a medium that eventually drives a shock front propagating directly in front of it. Deflagration is typically described as subsonic combustion propagating through heat transfer. Detonation reactions are also generally characterized by the production of higher temperatures in the reactants and reaction products. In certain embodiments according to the present invention, detonation resulting in the production of graphene particles occurs at a temperature of at least 3000 K, at least 3500 K, or at least 4000 K. In particular embodiments, the detonation reaction occurs at a temperature of between about 3000 K to about 5000 K, between about 3500 K to about 4500K, or about 4000 K. This is contrast with deflagration-type reactions for the same reaction materials, which may have a flame temperature about 2200 K, several thousand Kelvin lower than the detonation reaction. It has been discovered that the higher temperatures associated with detonation of the reaction mixture controls whether the reaction product formed is merely a graphitic soot, or a highly ordered graphene. Inert gaseous materials such as He, Ne, Ar, or nitrogen can be included in the reaction mixture charged into the reaction vessel to assist with temperature control during detonation, if necessary. Also, the detonation of the reaction mixture proceeds very quickly relative to a deflagration reaction. In certain embodiments, the detonation has a duration of between about 5 to about 100 ms, between about 10 to about 75 ms, or between about 20 to about 50 ms.

The pressure of the reaction mixture within the reaction vessel prior to detonation may also vary to provide control over the reaction conditions and reaction products formed. In certain embodiments, the initial pressure of reactants with the reaction vessel may be between about 0.1 to about 3 atm, about 0.5 to about 2 atm, or about 1 atm. Pressure within the reaction vessel should be closely controlled so as to avoid possibility of damage to the vessel during the detonation operation.

The graphene particles produced by the detonation reaction are dispersed within the reaction vessel in the form of an aerosol. The graphene particles may tend to aggregate immediately upon formation into particles having an average size of between about 35 to about 250 nm, between about 50 to about 200 nm, or between about 75 to about 150 nm. In some embodiments, if the aggregation of the graphene particles were permitted to continue under quiescent conditions, the particles could aggregate to form a gel. The conditions and requirements for aggregation of particulate materials into solid aerosol gels are described in U.S. Pat. No. 7,691,909, incorporated by reference herein in its entirety. In order to form a gel, the particles typically must be left within the reaction vessel and substantially undisturbed for a significant period of time. In order to permit more rapid production of graphene particles, it can be desirable to perform as many detonations within the reaction vessel in a given period of time as possible. Therefore, in certain embodiments of the present invention it is desirable to remove the particles from the reaction vessel prior to the particles being able to aggregate sufficiently and form an aerosol gel. In particular embodiments, the removal of particles from the reaction vessel occurs while the particles remain dispersed as an aerosol. Exemplary means of removing the particles from the reaction vessel are discussed in greater detail below.

Figure 15:
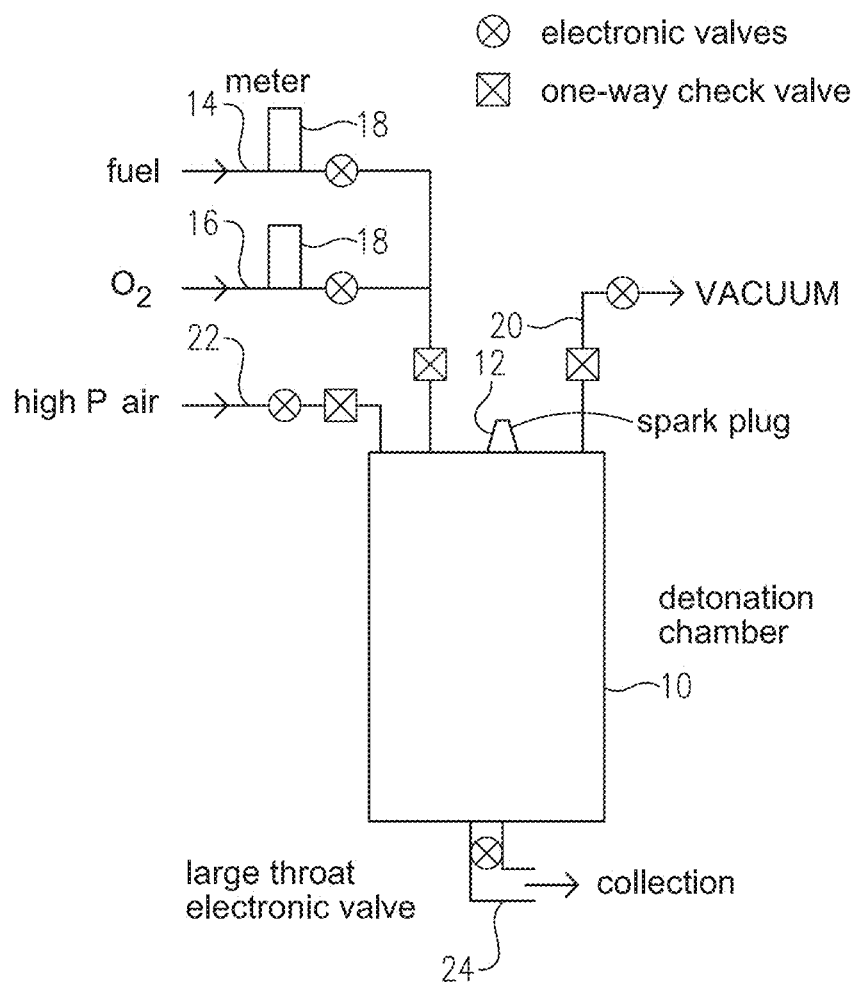
FIG. 15 is a schematic diagram of a cyclic detonation apparatus used in the production of graphene particles.

FIG. 15 illustrates an exemplary apparatus that may be used with the present invention for the manufacture of graphene particles in a cyclic process. A detonation chamber 10 is provided having a spark plug 12, or other device capable of providing the energy for initiating the detonation, installed therein. Fuel, comprising the carbon-containing material, is supplied to chamber 10 via line 14, and an oxidizing agent (e.g., $O_2$) is supplied by line 16. Both lines 14 and 16 may be equipped with meters 18 to ensure that the desired molar of oxidizing agent to carbon-containing material is supplied to chamber 10. A vacuum line 20 is provided so as to evacuate chamber 10 prior to the introduction of fuel and oxidizing agent. Once chamber 10 is loaded with the desired levels of fuel and oxidizing agent, spark plug 12 is actuated thereby causing the reaction mixture to detonate and form an aerosol of graphene particles. Following detonation, high-pressure air supplied by line 22 is directed into chamber 10 and the aerosol is forced out through conduit 24 and directed toward a separate collection chamber, such as a collection bag, electrostatic precipitator or a cyclone. The high-pressure air may be delivered via one or more air jets that are used not only to remove the graphene particles, but also guard against plug or valve fouling due to accumulation of graphene. In certain embodiments the interior of the detonation chamber 10 may be made reflective or very black in order to control the rate of cooling after the detonation, since the cooling following detonation is very likely radiative and the cooling rate could affect the size of the graphene particles produced.

Figure 16:
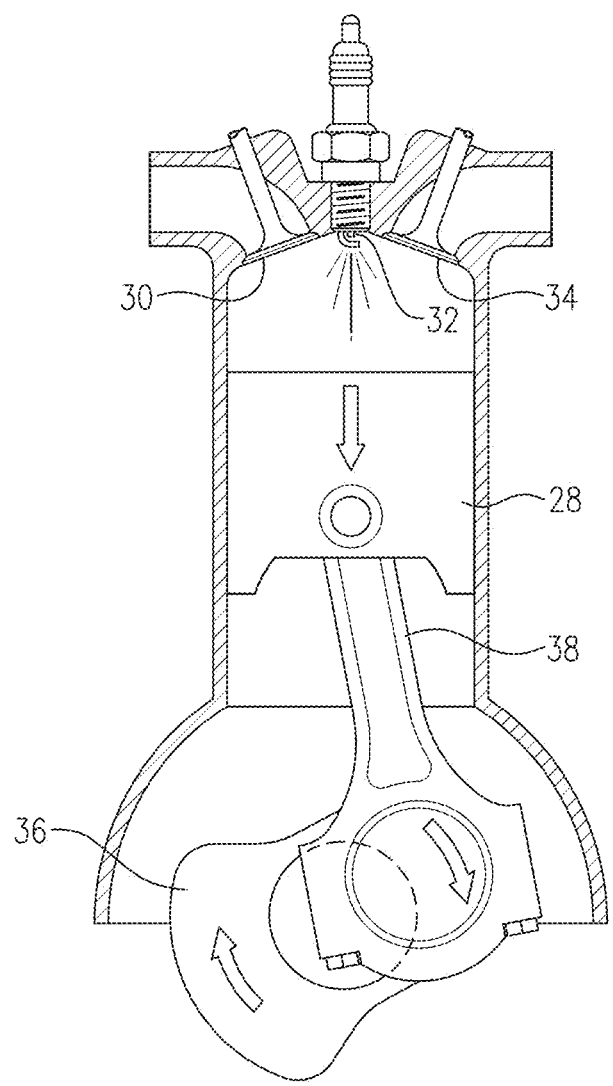
FIG. 16 is a schematic diagram of a detonation chamber comprising a cylinder and a reciprocating piston that can be used for continuous production of graphene nanosheets.

FIG. 16 illustrates another exemplary apparatus in that may be used to manufacture graphene particles. In this embodiment, a reaction chamber 26 is provided that is defined at least in part by a reciprocating piston 28. Reaction chamber 26 and piston 28 are configured similarly to a cylinder and piston found in a typical four-cycle engine. However, extracting work from the heat generated through combustion of fuel is not the primary objective with this set up. In one particular embodiment, a mixture of a carbon-containing compound (e.g., acetylene) and an oxidizing agent (e.g., oxygen) may be supplied into chamber 26 through a valve 30. Note, the carbon-containing compound and oxidizing agent may be fed through separate valves and combined for the first time within chamber 26 in any desired ratio.

Chamber 26 is equipped with a spark plug 32 that initiates detonation of the carbon-containing compound and oxidizing agent to produce graphene particles. While the graphene particles remain dispersed as an aerosol within chamber 26, exhaust valve 34 can be opened and piston 28 shifted upwardly toward spark plug 32 so as to expel the graphene aerosol from chamber 26. The aerosol is then directed toward other apparatus for collection of the graphene particles.

While the apparatus of FIG. 16 can be used in conjunction with a plurality of cylinders and pistons as might be found in a four-cycle engine, the apparatus need not be operated in the same manner as a traditional four-cycle engine. For example, a typical four-cycle engine will perform a compression step in which the fuel and air mixture supplied to the cylinder is compressed by an upward piston stroke prior to ignition. As the pressure of the reaction mixture prior to detonation can affect the characteristics of the graphene particles produced, such a compression step may or may not be desired. In such case, following detonation of the fuel/oxidizing agent mixture, piston 28 may be mechanically shifted upwardly within the cylinder 26 via work supplied by a rotatable member 36 and linkage 38. This apparatus has the advantage in that the chamber can be filled and emptied rather quickly enabling nearly continuous graphene production.

Examples

The following examples set forth various embodiments according to the present invention, namely methods of making graphene particles via a one-step, detonation process. It is to be understood, however, that these examples are provided by way of illustration and nothing therein should be taken as a limitation upon the overall scope of the invention.

Graphene nanosheets (GNs) in the form of a powder were prepared from the catalyst-free controlled detonation of $C_2H_2$ gas in the presence of $O_2$ in a 16.6-liter cylindrical aluminum chamber equipped with a quartz window of 8.5 cm×1.5 cm. The pre-detonation molar ratios of $O_2/C_2H_2$ were 0.4, 0.5, 0.6, 0.7, and 0.8. For each ratio, the initial chamber pressure was 1 atmosphere. The gases had purities of 98.0% for $C_2H_2$ and 99.0% for $O_2$ (both obtained from Linweld Lincoln). FIG. 1 schematically illustrates the experimental set up 40. In a typical batch, the detonation of $C_2H_2$ with $O_2$ was carried out by a controlled power supply 42 through a spark generator ignition system 44 connected to an automotive spark plug 46 fitted into the lid of the chamber 48. The successful detonation was confirmed by a mild "pop" sound heard after the ignition system 44 was turned on. The detonation pressure was measured with a data acquisition system (DAS) 50, Model: NI USB-6210, National Instruments, connected to a piezocrystal dynamic pressure sensor 52, model 482A21, PCB Peizotronics, installed in the lid of the chamber 48. The detonation temperature was determined by detecting the flash of light that was emitted from the hot soot through the quartz window 54 during the detonation using a two-color pyrometer 56, PCB Piezotronics. This pyrometer, which was also connected to the DAS 50, used two band-pass interference filters 58, 60 of 515 nm and 680 nm wavelengths, Edmund Optics. The temperature was calculated from the calibrated ratio of the intensities of the emitted light at these two wavelengths and Planck's black body law under the reasonable assumption that the soot emissivities at these two closely spaced wavelengths are equal. The same process was followed for all molar ratios.

The Wein's approximation to the Planck's equation for T<6000 K was used. It was assumed that the ratio of emissive power of the carbon particles at two very close wavelengths $\lambda_1$ and $\lambda_2$ is unity. Then a working formula for the two-color pyrometer is $$T_a = \frac{-6785}{\ln(C \times R_{ex} \times 0.25)} \quad (1)$$

where $T_a$ is the actual temperature, C is the calibration constant and Rex is the experimental ratio of the signals of light from $\lambda_1=515$ nm and $\lambda_2=680$ nm.

To determine the calibration constant, the standard terrestrial solar radiation spectrum, Air Mass 1.5 Global, published by American Society for Testing and Materials (ASTM E892-87 (1992) was used. With the calibration constant so determined, the measured temperature of the sun and tungsten filament lamps were 5600 K and 3200 K, respectively, with an uncertainty of ±200 K.

Figure 2:
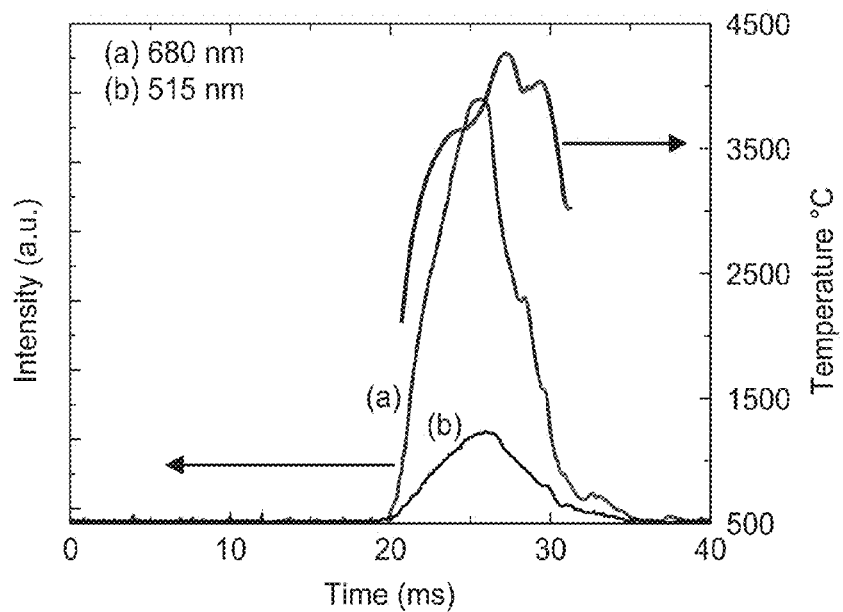

FIG. 2 presents the signal of light intensity versus time after the ignition system is turned on acquired through pyrometer equipped with 515 nm and 680 nm filters during the detonation which is completed in 40 ms. When the detonation flash light is higher than the background light, the intensity of the both signals recorded from two filters follow almost the same pattern of the variation with time and it continues for about 15 ms (see from 20 ms to 35 ms in FIG. 2). The temperature of detonation calculated from equation 1 is also plotted in FIG. 2. All the temperatures mentioned in Table 1 correspond to the time where the intensity of both the signals are maximum, and it is around 3900±200 K at 26 ms for the case shown in FIG. 2. Note that in FIG. 2 the maximum temperature appears to be ca. 4200 K but does not occur at the maximum intensity. This discrepancy is due to the finite experimental error. Temperatures lower than ca. 2000 K could not be measured accurately with the present pyrometer design. Nevertheless, it is apparent that the rapid cooling from the peak temperature occurs in ca. 6 ms.

During the detonation, the hydrocarbon was first converted into free carbon atoms or ions, which condensed into a nanoparticle carbon aerosols, which in turn quickly aggregated and then finally formed a gel, referred to herein as a Carbon Aerosol Gel (CAG). After the detonation, the chamber was allowed to cool to 300 K. The fluffy black CAG powder was collected from the chamber (see, inset FIG. 5), and is referred to herein as "detonation carbon". The material was homogeneous and subsequent characterization confirmed that it was one phase. The detonation pressure and temperature were measured with a data acquisition system. The same process was followed for all molar ratios. Table 1 shows the peak temperature and the pressure observed during detonation for different $O_2/C_2H_2$ molar ratios.

TABLE 1

The molar ratio $O_2/C_2H_2$, peak detonation temperature ($T_d$) and pressure ($P_d$) for preparation of GNs.

| Molar ratio $O_2/C_2H_2$ | $T_d$ (K) (±200 K) | $P_d$ (atm) (±1.5 atm.) |
|---|---|---|
| 0.4 | 3800 | 13.4 |
| 0.5 | 3900 | 13.1 |
| 0.6 | 4200 | 13.8 |
| 0.7 | 3600 | 14.3 |
| 0.8 | 3800 | 14.3 |

These high pressures and temperatures (ca. 4000 K), which are a consequence of the exothermic detonation of the hydrocarbon and oxygen, last for about 15 milliseconds during the detonation, after which the system rapidly cools (FIG. 2). The phase, layered structure, and the chemical compositions of detonation carbon were analyzed by XRD, TEM, Raman spectroscopy and X-ray Photoelectron spectroscopy.

Figure 8:
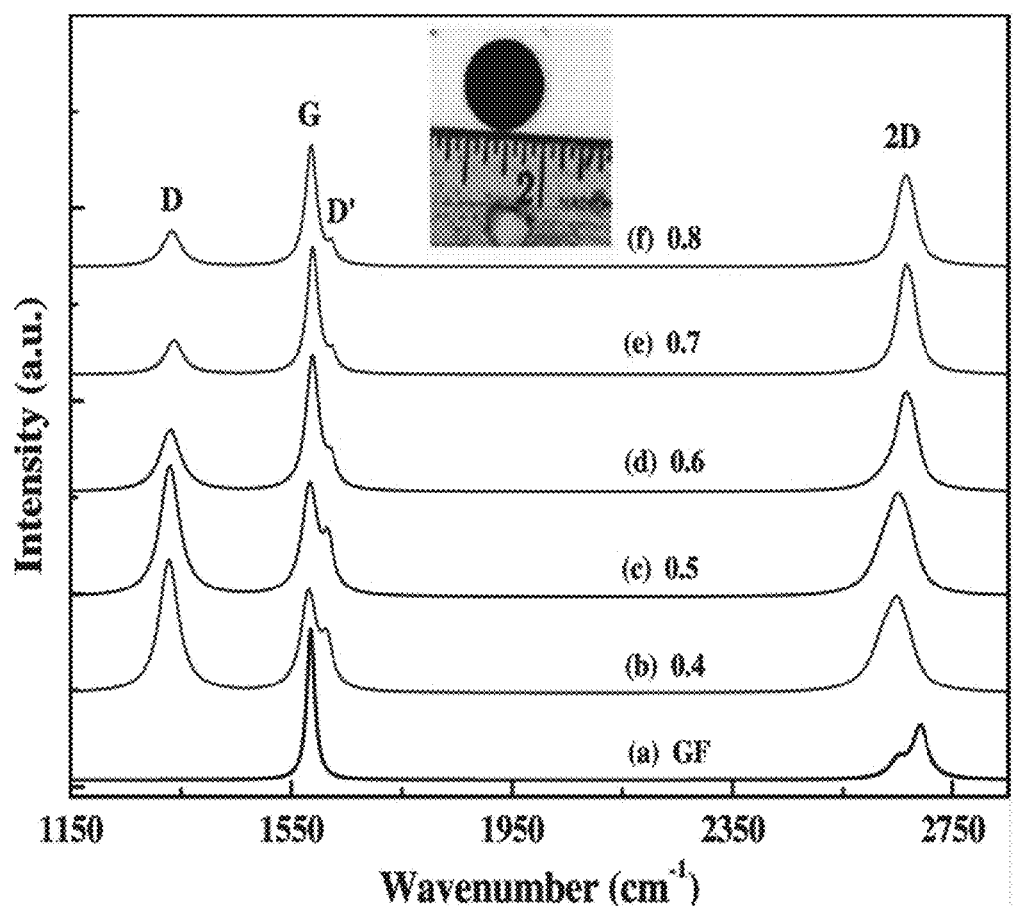
FIG. 8 depicts Raman spectra of GF and pristine GNs prepared by detonation of different molar ratios of $O_2/C_2H_2$, the inset shows the pellet form of GNs powder for Raman measurement.

X-ray diffraction was carried out using a Bruker D8 Advance X-ray diffractometer, with nickel filter Cu Kα radiation as the X-ray source to determine phase purity and degree of crystallization. The morphology and the size of the samples were determined with a FEI Company Nova NanoSEM 430 field emission scanning electron microscope, FESEM, at 3.5 kV and low vacuum with a TLD detector and Philips CM-100 transmission electron microscope (TEM) with an accelerating voltage of 100 kV. For TEM measurement, the samples were prepared by inserting Cu grids in the detonation carbon powder without using any solvent. The high resolution TEM images and SAED patterns were recorded by using FEI Tecnai F20 XT Field Emission Transmission Electron Microscope with an accelerating voltage of 200 kV. BET measurements were carried out using a Nova 1000 series surface area analyzer, Quantachrome instrument. Diffuse reflectance FTIR spectra were recorded via a Cary 630 FTIR spectrophotometer, Agilent Technology, USA over a range 500-4000 $cm^{-1}$. The X-ray photoelectron spectroscopy (XPS) of a Perkin-Elmer PHI 5400 spectrometer with Al Kα X-ray source (1486.6 eV) was used to obtain the chemical compositions of the samples. The spectrometer was calibrated using Au $4f_{7/2}$ at 84.0 eV and Cu $2p_{3/2}$ at 932.7 eV. The base pressure of the analysis chamber was below $10^{-9}$ mbar. The room temperature Raman spectra were obtained on pellets of 10 mm diameter and 2 mm thick (as shown in the inset of FIG. 8) with an iHR550 Raman spectrophotometer, Horiba Jobin Yvon with a HeNe laser (632.8 nm) as the excitation source.

Figure 3:
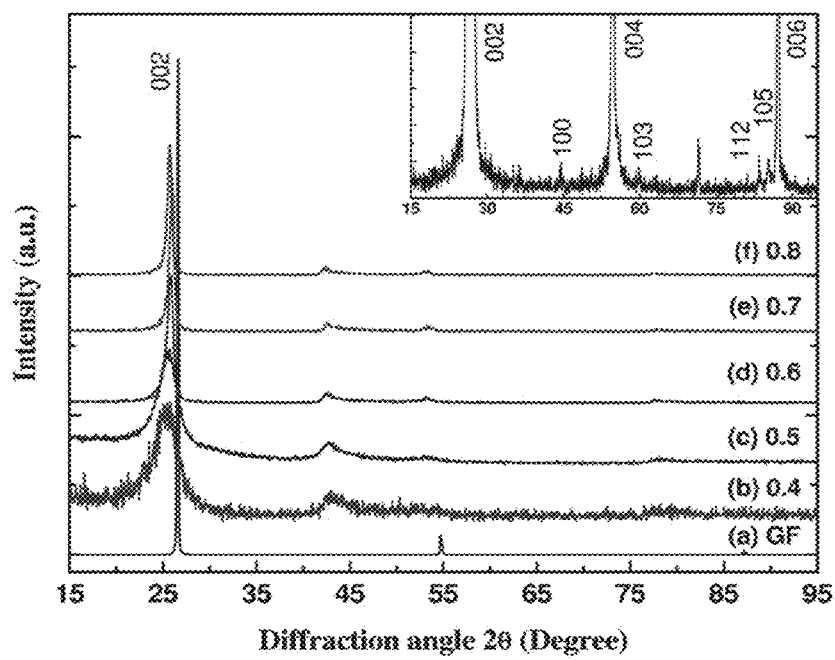
FIG. 3 is a graph of the XRD patterns of (a) graphite flakes (GF), and (b through f) the detonation carbon graphene nanosheets (GNs) prepared by detonation with different $O_2/C_2H_2$ molar ratios, the magnified spectrum of (a) is shown in the inset.

The X-ray diffraction (XRD) patterns of the detonation carbon obtained at $O_2/C_2H_2$ of 0.4, 0.5, 0.6, 0.7, and 0.8 and graphite flakes (GF, obtained from Alfa Aesar for comparison) are depicted in FIG. 3. FIG. 3(a) shows seven well defined diffraction peaks that are characteristic of graphite with the most intense (002) peak centered at 26.6° (enlarged in the inset), while the (002) peak of the detonation carbon is centered at 26.05° [FIG. 3(b)-(f)] to imply an interplanar spacing (d) of 0.341 nm, which is larger than d=0.335 nm of GF. The determined d=0.341 nm for the detonation carbon is in good agreement with the XRD pattern reported for pristine GNs synthesized by other methods. Hence, the detonation carbon resembles the graphitic (graphene) structure. In addition, the reduction in full width at half maxima (FWHM) of the (002) peak with increasing $O_2/C_2H_2$ ratio indicates an increased size of the crystallite and, thus, more crystalline order.

Figure 4:
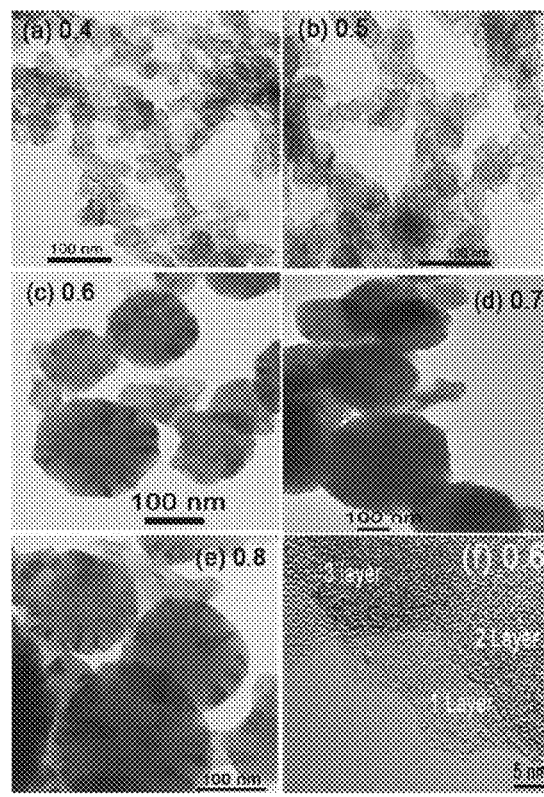
FIG. 4 shows TEM images (a-e) of GNs prepared by detonation of different molar ratios of $O_2/C_2H_2$, image (f) is an HRTEM image of GNs at 0.6 showing the number of layers.
Figure 6:
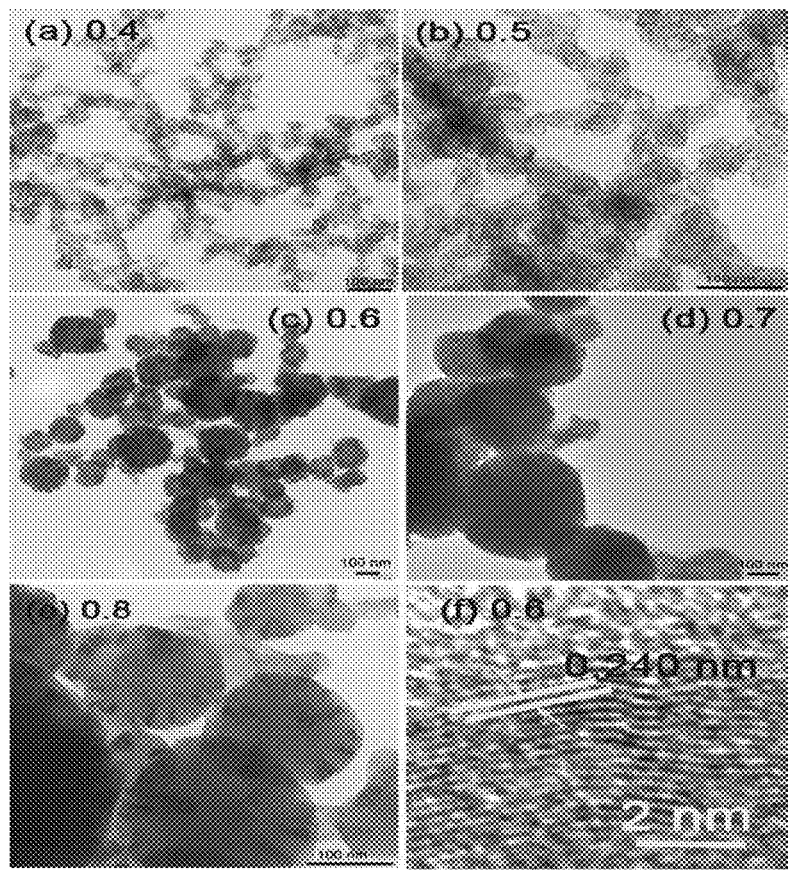
FIG. 6 shows TEM images of GNs prepared by detonation of different molar ratio of $O_2/C_2H_2$ (a-f)
Figure 7:
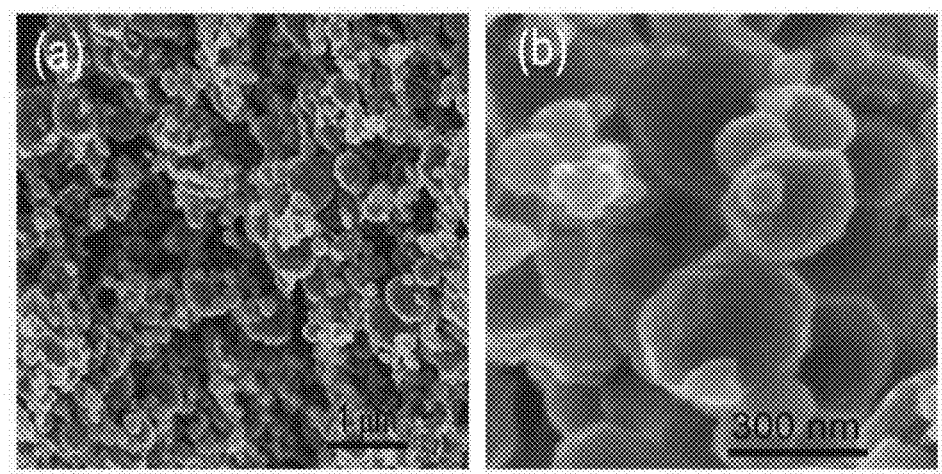
FIG. 7 shows (a) an FESEM image of GNs powder prepared by detonation of $O_2/C_2H_2$ of 0.8, and (b) a magnified image of (a)

FIG. 4 (a-e) shows TEM images of the detonation carbon powder obtained at different $O_2/C_2H_2$ gas ratios. All images reveal that the layers in detonation carbon are transparent, crumpled, folded, and randomly stacked on each other. They show a laminar morphology with crumpling consistent with the structure of pristine two-dimensional graphene prepared by other methods. This crumpling is intrinsic to graphene sheets because a thermodynamically unstable two-dimensional sheet undergoes microscopic crumpling via bending or buckling to get thermodynamically stable three-dimensional structures in localized regions. In FIG. 4(a, b), the detonation carbon prepared with $O_2/C_2H_2=0.4$ and 0.5, respectively, show transparent ramified fractal aggregates of GNs. These aggregates have dense regions about 35-55 nm size connected by thin, continuous, twisted, ribbon-like structures. See, FIG. 6(a,b). This implies that the detonation carbon consists of GNs interlaced with one another. With increasing ratios from 0.6 to 0.8, the GNs show a distinct feature of nearly circular shape with an increased size of about 225-250 nm. See, FIG. 4(*c-e*) and FIG. 6 (*c-e*). The similar layer morphology stacked over each other around 250-350 nm size of the GNs powder prepared from $O_2/C_2H_2$ of 0.8 is observed in FESEM as shown in FIG. 7. The $O_2/C_2H_2$ ratio dependence of GNs size observed in TEM images is consistent with the (002) peak widths in the XRD spectra. See, FIG. 3(*b*)-(*f*). Thus, the detonation carbon appears to be composed of GNs and is hereafter referred to as such. Moreover, in the samples of lower $O_2/C_2H_2$, the randomly oriented GNs, FIG. 4(*a-b*), exhibit many thin layers entangled with each other with overlapped edges, while more ordered stacking of GNs in mostly two to three layers is observed for the samples of higher $O_2/C_2H_2$ as seen in FIG. 4(*c-e*). The HRTEM image of the edge of the GNs in FIG. 4(*f*) shows the layer structure more closely.

Figure 9:
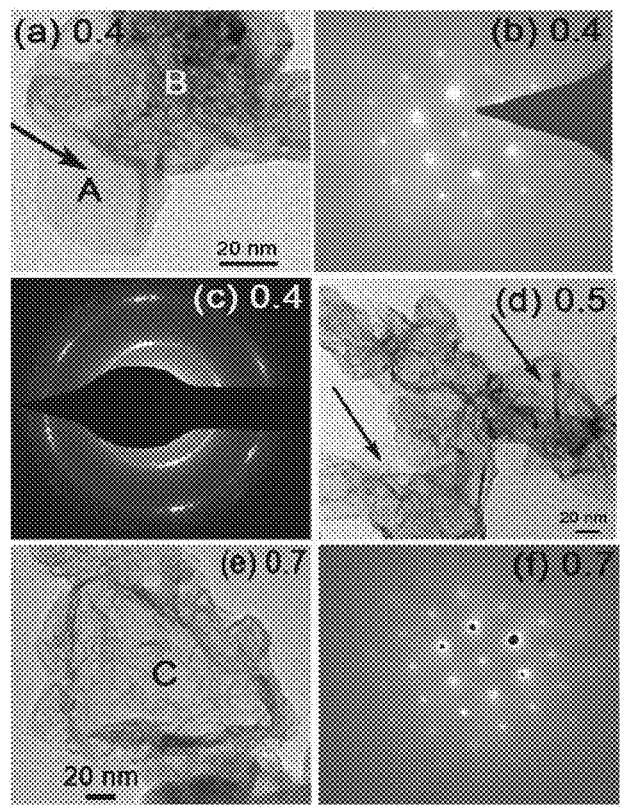
FIG. 9 shows high magnification TEM images and SAED patterns of GNs prepared by detonation of different molar ratios of $O_2/C_2H_2$ (a-f), the SAED patterns of regions marked with 'A', 'B', and 'C' are shown in (b), (c) and (f), respectively, arrows indicate the monolayer GNs.

High magnification TEM images and the SAED patterns of the GNs of selected regions are shown in FIG. 9. The transparent and featureless regions, indicated by arrows in FIG. 9(*a,d*), are likely to be monolayer graphene, which tends to scroll at the edges. The SAED patterns in FIG. 9(*b,c,f*) confirm the crystalline structure of the GNs. The diffraction patterns of the region marked with 'A' and 'C' in FIG. 9(*a,e*) show six-fold symmetry, see, FIG. 9(*b,f*), similar to monolayer graphene, whereas the region marked with 'B' in FIG. 9(*a*) shows misaligned diffraction spots in tiny arc shapes representing randomized six-fold symmetry as shown in FIG. 9(*c*). The misaligned spots could be due to crumpled local regions in GNs. The HRTEM images of GNs depicted in FIG. 6(*f*) shows the lattice fringes spacing of 0.240 nm, which is in good agreement with the in-plane lattice constant of 0.246 nm for graphite.

Figure 5:
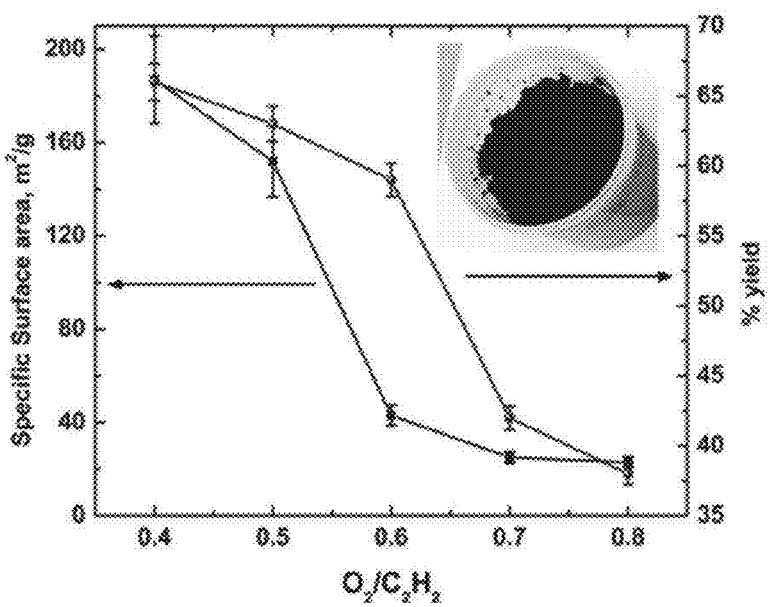
FIG. 5 is a graph of the specific surface area and yield of GNs powder, the inset shows the bulk quantity ~7.4 g graphene powder collected after a detonation.
Figure 10:
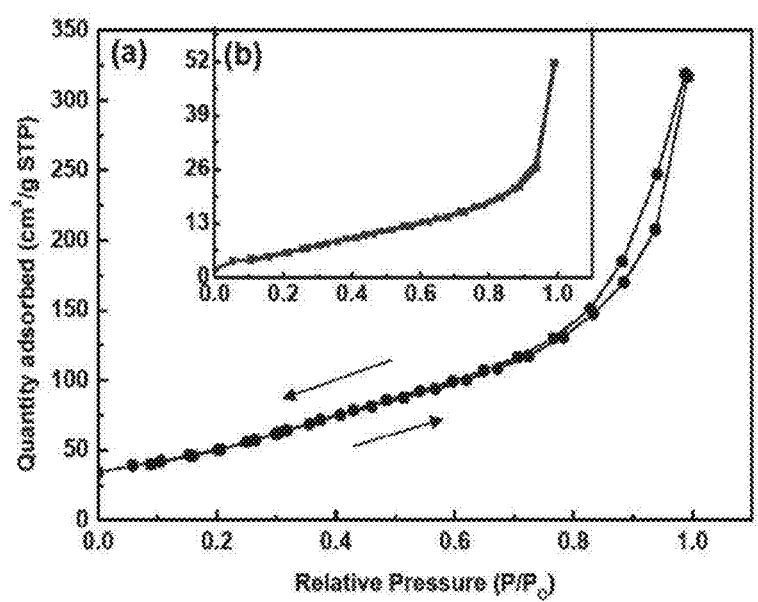
FIG. 10 shows two graphs of nitrogen adsorption/desorption isotherm of GNs prepared by detonation of $O_2/C_2H_2$ of molar ratios (a) 0.4 and (b) 0.8.

The Brunauer-Emmett-Teller (BET) specific surface area (SSA) of the GNs measured from N2 adsorption desorption isotherms at 77 K is shown in FIG. 10. The isotherms exhibit type-II pattern and type H3 hysteresis loop. The adsorption hysteresis suggests that the isotherm is a pseudo type-II pattern due to multi-layer adsorption in materials having slit-like pores or aggregates of platy particles. In graphene, adsorption occurs on the surface of the graphene sheets, but due to their few layered structure, slit-like open pores exist. These open pores are responsible for the hysteresis loop observed in graphene materials. From the linear region of the graph and using the BET equation, it is found that the SSA lies in between 23 to 187 $m^2 g^{-1}$ (FIG. 5), which is significantly lower than the theoretical SSA of 2630 $m^2 g^{-1}$ for individual isolated graphene sheets. However, the SSA of the detonation carbon prepared at 0.4 $O_2/C_2H_2$ is close to the previously reported SSA-value of 184 $m^2 g^{-1}$ for GNs. A significant finding is that the yield per detonation of the GNs is high, in the range of 38% to 66% as shown in FIG. 5. It is found that the mass of the GNs is decreased as the amount of $O_2$ is increased in the gaseous mixture.

Figure 11:
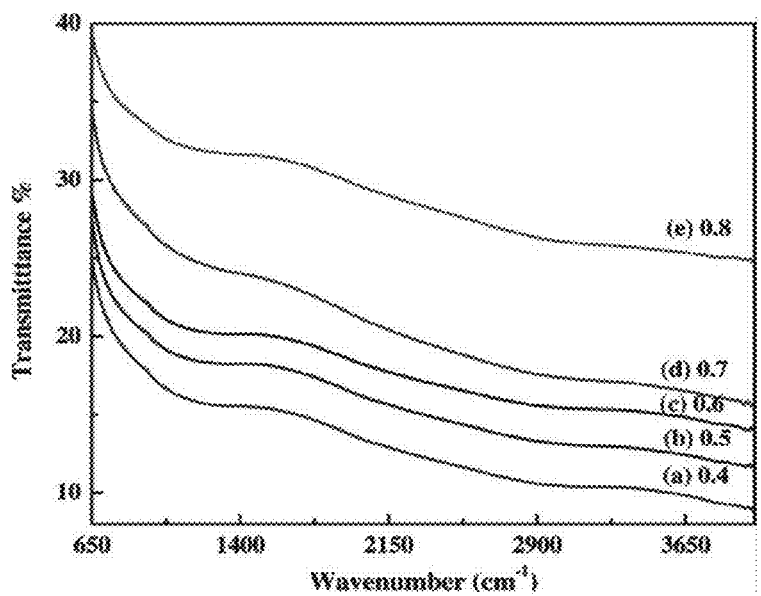
FIG. 11 is a graph of the DRIFTS-FTIR spectra of GNs prepared by detonation of different molar ratios of $O_2/C_2H_2$.
Figure 12:
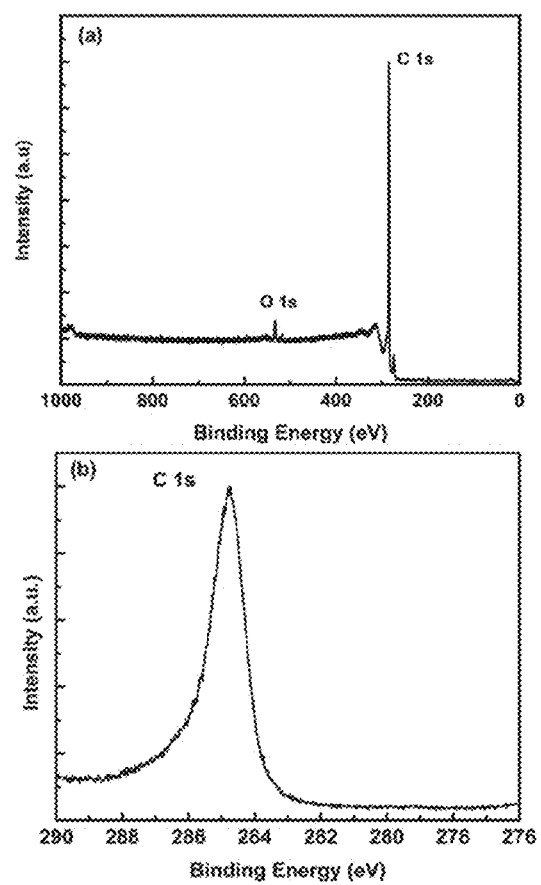
FIG. 12 depicts XPS spectra of graphene powder prepared after detonation of $O_2/C_2H_2$ ratio of 0.4 (a) survey and (b) C is spectrum detail.
Figure 13:
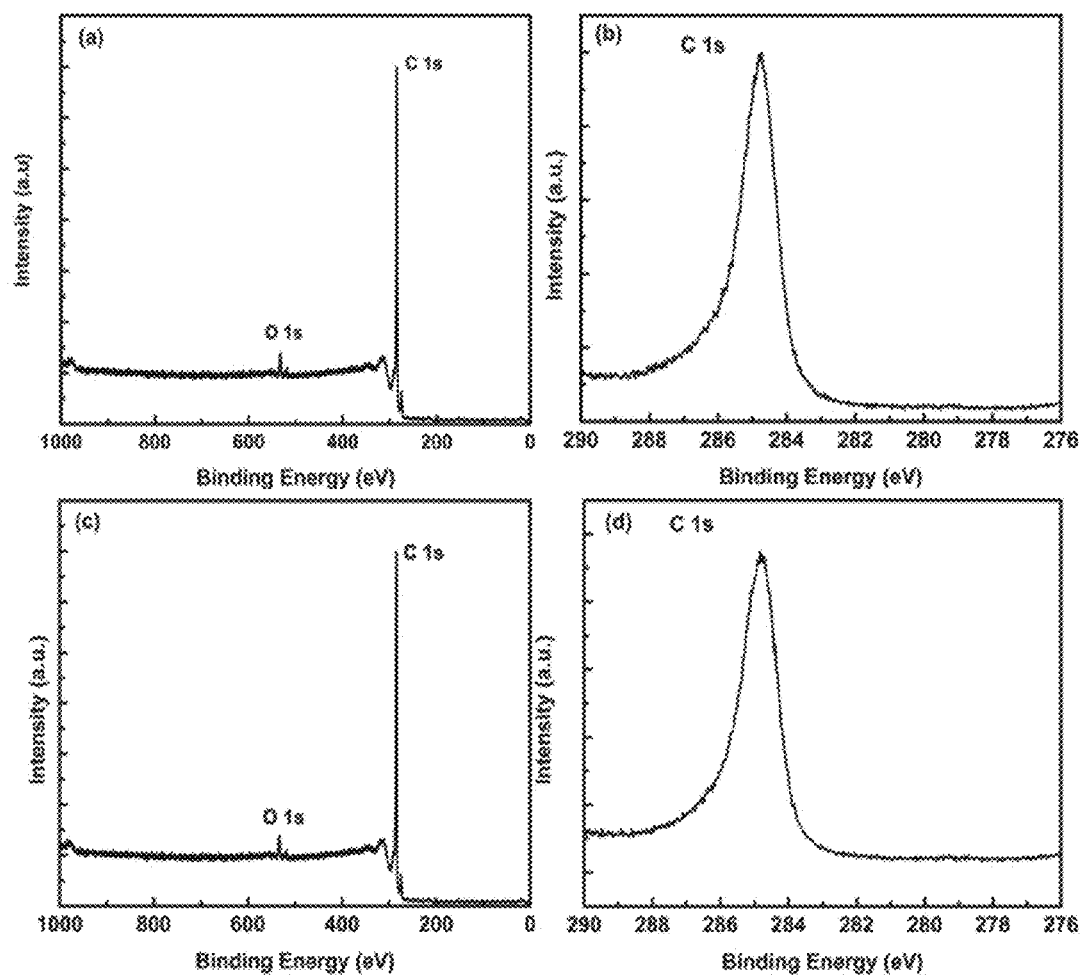
FIG. 13 depicts XPS spectra of graphene powder prepared after detonation of $O_2/C_2H_2$ ratio of 0.4 (a) survey and (b) C 1s, and $O_2/C_2H_2$ ratio of 0.8 (c) survey and (d) C 1s.

The Drifts-FTIR measurement was performed to explore the surface functional groups present on GNs produced by detonation. FIG. 11 displays the Drifts-FTIR spectra of detonation carbon prepared with different $O_2/C_2H_2$ ratio. As the production method involves $C_2H_2$ and $O_2$, one might expect some carboxyl or epoxy groups and hydrogen attached to the surface of GNs. However, the spectra (FIG. 11) do not show any features of functional group attached to the surface of the detonation carbon GNs, suggesting its pristine nature. The chemical composition of GNs is further explored by X-ray Photoelectron Spectroscopy (XPS). The XPS spectra of graphene obtained after detonation of $O_2/C_2H_2$ of 0.4 is presented in FIG. 12. The survey XPS spectrum in FIG. 12(*a*) indicates that the graphene is very pure because the actual ratio of C to O is about 49:1. Since XPS measures the composition on the sample surface, the presence of trace oxygen in the survey spectrum can be influenced by the moisture absorption on the surface from the atmosphere. However, the enlarged view of the C is spectrum presented in FIG. 12(*b*) shows a single peak around 284.8 eV, which is associated with graphitic carbon. Moreover, the asymmetry in the peak is due to structural disorder at the edges of the $sp^2$ network in graphene where the plane of carbon and any carbon fragments could be interacting by the surface oxygen attached during the transfer of the sample to the XPS instrument. No additional signals are observed (see, FIG. 13(*c,d*) for XPS of $O_2/C_2H_2$ of 0.8 as well) to imply that no other functional groups are attached with the C—C system of GNs. This is consistent with the FTIR data mentioned above. These results confirm the one-phase, pristine nature of the GNs produced here.

The structure and quality of the detonation carbon GNs were analyzed by using Raman spectroscopy. FIG. 8 shows the Raman spectra of GF and the detonation carbon GNs measured at an excitation wavelength of 632.8 nm under ambient conditions. FIG. 8(*a*) presents characteristic G- and 2D-bands of GF at 1584 and 2690 $cm^{-1}$, respectively, and the absence of defect (D) band indicates that GF are almost defect free. The sharp G-band at 1584 $cm^{-1}$ corresponds to an optical $E_{2g}$ phonon at the Brillouin Zone center of all $sp^2$ hybridized carbons, while the 2D-band at 2690 $cm^{-1}$ corresponds to overtones of the D-band. This band is present even in absence of defects because it is the sum of two phonons with opposite momentum. It is the most prominent feature for graphene in the Raman spectrum, and its position and shape can be used to distinguish between single-layer, double-layer and few-layer graphene with AB interlayer stacking.

Figure 14:
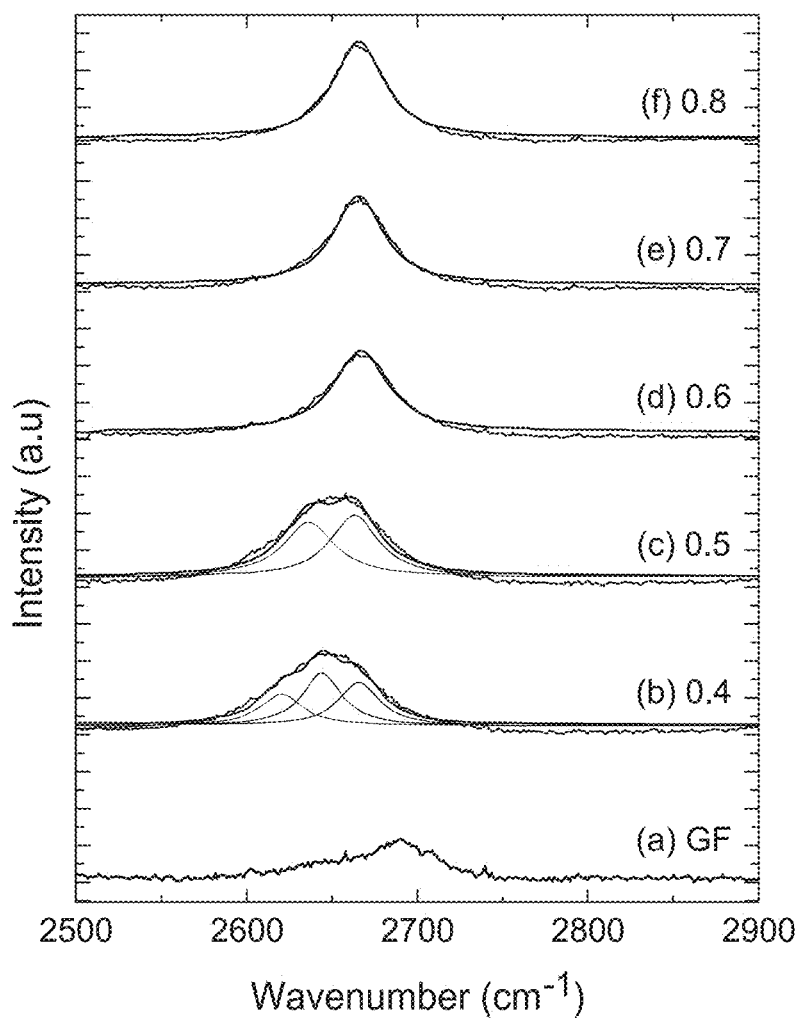
FIG. 14 is an expanded view of 2D band in Raman spectra of GF and pristine GNs prepared by detonation of different molar ratio of $O_2/C_2H_2$.

As shown in FIG. 8(*b-f*), the Raman spectra of the detonation carbon GNs show two new bands at 1328 and 1610 $cm^{-1}$ along with G- and 2D-bands at 1580 and 2650 $cm^{-1}$. The band at 1328 $cm^{-1}$ is assigned to the D-band, which is due to an intervalley double resonance (DR) Raman process from the transverse optical modes of K-point phonons of $A_{1g}$ symmetry in a structural defect or partially disordered structures of the $sp^2$ domains in GNs. The peak at 1610 $cm^{-1}$ is called the D'-band that occurs via an intravalley DR process in the presence of defects. Furthermore, the relative intensity of D- and G-bands is a convenient way to estimate the extent of defects and the size of in-plane $sp^2$ domain in the GNs. One observation is that the intensity of the D-band decreases with increasing $O_2$ content. The intensity ratio of the D- and G-bands (ID/IG) in GNs decreases from 1.33 to 0.28 for 0.4 to 0.8 $O_2/C_2H_2$ ratio. This indicates that partial $sp^2$ domains are restored at different levels, and the graphitic degree of GNs is also improved accordingly due to the reduction effect and self-repairing of the graphene layer at high $O_2$ content. The shape of the 2D-band is $O_2$ content dependent. At 0.4 $O_2/C_2H_2$, the 2D-band is broad to imply many layers of GNs, as is also evident from TEM images in FIG. 6(*a*). The width gradually decreases from 65 to 43 $cm^{-1}$ (see FIG. 14) with increasing $O_2$ content, becoming sharpest for 0.8 $O_2/C_2H_2$. This evolution of sharpness of the 2D-band implies the transformation of GNs from many layers to two to three layers with increasing $O_2$ content (the width of the 2D band for monolayer graphene is 24 $cm^{-1}$). Hence, it can be concluded that $O_2$ plays a vital role for GNs quality in this particular process.

The question remains why graphene is created in this detonation process instead of normal carbonaceous soot.

The mechanism of graphene production is undoubtedly as difficult to describe as the mechanism of soot formation in flames, a description that remains incomplete. However, an important clue to a description might lie in Table 1, which shows the peak temperatures and pressures observed during detonation for the different molar ratios of $O_2/C_2H_2$ used. No functionality with molar ratio is observed beyond the estimated errors of the measurements. These temperatures and pressures are consistent with each other under the assumption of no change in the total moles of gas in the chamber from before detonation, at ca. 300 K and 1 atm, to the peak temperature. The peak detonation temperature of about 4000 K is roughly twice the combustion temperature of sooting hydrocarbon/air diffusion flames including $C_2H_2$. The "normal" soot produced in such flames comprises roughly spherical monomers (primary particles) with diameters in the range of 20 to 50 nm joined together into fractal aggregates. The composition of these monomers is typically mostly carbon with a carbon/hydrogen ratio of about 8, and the carbon is nearly amorphous being composed of many small graphitic planes. In strong contrast detonation carbon is pure carbon with graphene morphology and characteristics; it is graphene. Based on the temperature measurements made, it is proposed that the key difference is the temperature. It is further hypothesized that high temperature, such as 4000 K, completely decomposes the hydrocarbon precursor to yield carbon atoms or ions, which then rapidly combine after the high temperature phase to form graphene. This is very different than the current view of normal soot formation in a flame which describes soot formation as a chemical process involving molecular polymerization up a chain of polyaromatic hydrocarbons followed by dehydrogenation to soot.

In summary, the foregoing examples illustrate a simple, quick, one-step, eco-friendly, high-yield method for the gram scale production of graphene nanosheets. The method involves the controlled detonation of $C_2H_2$ in the presence of $O_2$. The high temperature of the detonation, ca. 4000 K, is theorized to be the cause of graphene production rather than normal soot. This method is environmentally friendly and does not result in contamination of the graphene product. The processes described above can be scaled up to produce 300 grams/hour or more of graphene nanosheets thereby enabling production levels required for industrial application.

We claim:

1. A method of synthesizing a graphene particulate material comprising:
   providing within an enclosed vessel a mixture comprising a combustible carbon-containing material and an oxidizing agent for said carbon-containing material, wherein said combustible carbon-containing material comprises a hydrocarbon compound;
   detonating said mixture within said vessel and producing a temperature within said vessel of at least 3000 K so as to generate graphene particles; and
   recovering said graphene particles from said vessel before said particles can sufficiently aggregate into a gel.

2. The method according to claim 1, wherein said hydrocarbon compound comprises a C1-C12 hydrocarbon compound.

3. The method according to claim 2, wherein said hydrocarbon compound comprises acetylene.

4. The method according to claim 1, wherein said oxidizing agent comprises oxygen.

5. The method according to claim 4, wherein said oxidizing agent comprises a member selected from the group consisting of air, $O_2$, $N_2O$, NO, and mixtures thereof.

6. A method of synthesizing a graphene particulate material comprising:
   providing within an enclosed vessel a mixture comprising a combustible carbon-containing material and an oxidizing agent for said carbon-containing material, wherein the molar ratio of said oxidizing agent to said carbon-containing material is 1.5 or less;
   detonating said mixture within said vessel and producing a temperature within said vessel of at least 3000 K so as to generate graphene particles; and
   recovering said graphene particles from said vessel before said particles can sufficiently aggregate into a gel.

7. A method of synthesizing a graphene particulate material comprising:
   providing within an enclosed vessel a mixture comprising a combustible carbon-containing material and an oxidizing agent for said carbon-containing material;
   detonating said mixture within said vessel and producing a temperature within said vessel of at least 3000 K so as to generate graphene particles, wherein detonation of said mixture within said vessel produces an aerosol comprising said graphene particles; and
   recovering said graphene particles from said vessel before said particles can sufficiently aggregate into a gel by removing said aerosol from said vessel.

8. The method according to claim 7, wherein said graphene particles recovered from said vessel have an average particle size of between about 35 to about 250 nm.

9. A method of synthesizing a graphene particulate material comprising:
   providing within an enclosed vessel a mixture comprising a combustible carbon-containing material and an oxidizing agent for said carbon-containing material;
   detonating said mixture within said vessel and producing a temperature within said vessel of at least 3000 K so as to generate graphene particles,
   recovering said graphene particles from said vessel, wherein said graphene particles recovered from said vessel before said particles can sufficiently aggregate into a gel are in the form of graphene nanosheets.

10. The method according to claim 1, wherein said detonation occurs in the absence of a catalyst.

11. The method according to claim 1, wherein said detonation during which said graphene particles are generated has a detonation period of between about 5 to about 100 msec.

12. A method of synthesizing a graphene particulate material comprising:
   providing within an enclosed vessel a mixture comprising a combustible carbon-containing material and an oxidizing agent for said carbon-containing material;
   detonating said mixture within said vessel and producing a temperature within said vessel of at least 3000 K so as to generate graphene particles; and
   recovering said graphene particles from said vessel, wherein said vessel comprises a chamber defined by a reciprocating piston located within a cylinder.

13. A method of synthesizing a graphene particulate material comprising:
   providing within an enclosed vessel a mixture comprising a C1-C12 hydrocarbon compound and oxygen;

detonating said mixture within said vessel and generating a temperature within said vessel of at least 3000 K thereby producing an aerosol comprising graphene nanosheets;

removing said graphene nanosheets from said vessel prior to aggregation of said graphene nanosheets into a carbon gel.

14. The method according to claim 13, wherein said hydrocarbon compound comprises acetylene.

15. The method according to claim 13, wherein said oxygen is provided in the form of a member selected from the group consisting of air, $O_2$, $N_2O$, NO, and mixtures thereof.

16. The method according to claim 13, wherein the molar ratio of oxygen to said hydrocarbon compound is 1.5 or less.

17. The method according to claim 13 wherein said removing step comprises removing said aerosol from said vessel.

18. The method according to claim 13, wherein said graphene particles recovered from said vessel have an average particle size of between about 35 to about 250 nm.

19. The method according to claim 13, wherein said detonation occurs in the absence of a catalyst.

20. The method according to claim 13, wherein said detonation during which said graphene particles are generated has a detonation period of between about 5 to about 100 msec.

21. A method of synthesizing a graphene particulate material comprising:

providing within an enclosed vessel a mixture comprising a combustible carbon-containing material and an oxidizing agent for said carbon-containing material, wherein said combustible carbon-containing material comprises a hydrocarbon compound;

detonating said mixture within said vessel so as to generate graphene particles; and recovering said graphene particles from said vessel prior to aggregation of said graphene particles into a carbon gel.

22. The method according to claim 21, wherein said hydrocarbon compound comprises a C1-C12 hydrocarbon compound.

23. The method according to claim 22, wherein said hydrocarbon compound comprises acetylene.

24. The method according to claim 21, wherein said oxidizing agent comprises oxygen.

25. The method according to claim 24, wherein said oxidizing agent comprises a member selected from the group consisting of air, $O_2$, $N_2O$, NO, and mixtures thereof.

26. The method according to claim 21, wherein said detonation occurs in the absence of a catalyst.

27. The method according to claim 21, wherein said detonation during which said graphene particles are generated has a detonation period of between about 5 to about 100 msec.

28. A method of synthesizing a graphene particulate material comprising:

providing within an enclosed vessel a mixture comprising a combustible carbon-containing material and an oxidizing agent for said carbon-containing material, wherein the molar ratio of said oxidizing agent to said carbon-containing material is 1.5 or less;

detonating said mixture within said vessel so as to generate graphene particles; and recovering said graphene particles from said vessel prior to aggregation of said graphene particles into a carbon gel.

29. A method of synthesizing a graphene particulate material comprising:

providing within an enclosed vessel a mixture comprising a combustible carbon-containing material and an oxidizing agent for said carbon-containing material;

detonating said mixture within said vessel so as to generate graphene particles, wherein detonation of said mixture within said vessel produces an aerosol comprising said graphene particles; and recovering said graphene particles from said vessel prior to aggregation of said graphene particles into a carbon gel, wherein said recovering step comprises removing said aerosol from said vessel and wherein said graphene particles recovered from said vessel have an average particle size of between about 35 to about 250 nm.

30. A method of synthesizing a graphene particulate material comprising:

providing within an enclosed vessel a mixture comprising a combustible carbon-containing material and an oxidizing agent for said carbon-containing material;

detonating said mixture within said vessel so as to generate graphene particles; and recovering said graphene particles from said vessel prior to aggregation of said graphene particles into a carbon gel, wherein said graphene particles recovered from said vessel are in the form of graphene nanosheets.

31. A method of synthesizing a graphene particulate material comprising:

providing within an enclosed vessel a mixture comprising a combustible carbon-containing material and an oxidizing agent for said carbon-containing material;

detonating said mixture within said vessel so as to generate graphene particles; and recovering said graphene particles from said vessel prior to aggregation of said graphene particles into a carbon gel, wherein said vessel comprises a chamber defined by a reciprocating piston located within a cylinder.

* * * * *